US008574110B2

(12) United States Patent
Hoffman

(10) Patent No.: US 8,574,110 B2
(45) Date of Patent: Nov. 5, 2013

(54) TRANSMISSION PRODUCING STEPLESS VARIABLE SPEED RATIOS

(75) Inventor: Donald E. Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 345 days.

(21) Appl. No.: 12/848,269

(22) Filed: Aug. 2, 2010

(65) Prior Publication Data

US 2011/0165988 A1 Jul. 7, 2011

(51) Int. Cl.
*F16H 37/02* (2006.01)

(52) U.S. Cl.
USPC .......................................................... 475/215

(58) Field of Classification Search
USPC .................................................. 475/215, 216
See application file for complete search history.

(56) References Cited

U.S. PATENT DOCUMENTS 3,340,749 A * 9/1967 Schrciner et al. ............. 475/211
5,112,283 A * 5/1992 Miyata et al. ................. 475/211
5,453,061 A 9/1995 Fellows
5,690,576 A * 11/1997 Moroto et al. ................ 475/211
5,833,571 A 11/1998 Tsukamoto et al.
5,853,343 A 12/1998 Eggert et al.
5,984,820 A * 11/1999 Wedeniwski ................. 475/193
6,045,477 A 4/2000 Schmidt
6,093,131 A * 7/2000 Rohs ............................... 476/53
6,258,003 B1 * 7/2001 Hirano et al. ................. 475/216
6,540,639 B1 4/2003 Gumpoltsberger
6,561,941 B2 * 5/2003 Nakano et al. ................ 475/214
6,569,052 B2 * 5/2003 Sakai et al. ................... 475/214
6,659,901 B2 * 12/2003 Sakai et al. ................... 475/218
6,723,016 B2 * 4/2004 Sumi ............................. 475/216
6,875,152 B2 * 4/2005 Iwatuki et al. .................. 477/44
7,048,667 B2 * 5/2006 DeVincent et al. ........... 475/214
7,232,396 B2 6/2007 Reisch et al.
7,238,135 B2 7/2007 Coffey et al.
7,574,935 B2 8/2009 Rohs et al.
7,654,930 B2 * 2/2010 Rohs et al. ....................... 476/53
7,682,278 B2 * 3/2010 Rohs et al. ..................... 475/215
2011/0165985 A1 * 7/2011 Hoffman et al. .............. 475/189
2011/0165986 A1 * 7/2011 Hoffman et al. .............. 475/214

* cited by examiner

*Primary Examiner* — Dirk Wright
(74) *Attorney, Agent, or Firm* — James Dottavio; MacMillan, Sobanski & Todd, LLC

(57) ABSTRACT

A transmission includes a variator including a cone secured to an input, and a second cone driveably connected to the cone, producing a variable speed ratio between the cones, a gearset including a member secured to the second cone, and second and third members, a first clutch opening and closing a connection between the input and the second member, and a second clutch opening and closing a connection between an output and the third member.

18 Claims, 4 Drawing Sheets

| | Input | Output |
|---|---|---|
| Final Drive | 29 | 108 |
| Mode 1 Gearset | 29 | 98 |
| | | |

| Mixing Planetary 32 | |
|---|---|
| Sun | 119 |
| Ring | 262 |
| Pinion | 71 |
| Beta | 2.2017 |

| Mode | Variator Speed Ratio | 34 Input | 36 Var. Output | 22 Mode 1 Gear Out | 50 Sun Gear | 52 Ring Gear | 56 Carrier | 14 FD Input | FD Output |
|---|---|---|---|---|---|---|---|---|---|
| 1st Mode | −1.6923 | 1.0000 | −1.6923 | −0.2959 | −1.6923 | 0.3383 | −0.2959 | 0.3383 | −0.0908 |
| 1st Mode | −.09474 | 1.0000 | −0.9474 | −0.2959 | −0.9474 | 0 | −0.2959 | 0 | 0 |
| 1st Mode | −0.2959 | 1.0000 | −0.2959 | −0.2959 | −0.2959 | −0.2959 | −0.2959 | −0.2959 | 0.0795 |
| 2nd Mode | −0.2959 | 1.0000 | −0.2959 | −0.2959 | −0.2959 | −0.2959 | −0.2959 | −0.2959 | 0.0795 |
| 2nd Mode | −0.5944 | 1.0000 | −0.5944 | −0.2959 | −0.5944 | −0.5944 | −0.5944 | −0.5944 | 0.1596 |
| 2nd Mode | −1.6923 | 1.0000 | −1.6923 | −0.2959 | −1.6923 | −1.6923 | −1.6923 | −1.6923 | 0.4544 |

Fig. 4

| | Input | Output |
|---|---|---|
| Final Drive | 15 | 82 |
| Mode 1 Gearset | 29 | 98 |
| Mode 3 Gearset | 88 | 52 |

| Mixing Planetary 32 | |
|---|---|
| Sun | 67 |
| Ring | 118 |
| Pinion | 25 |
| Beta | 1.7612 |

| | Mode 1 Clutch 28 | Mode 2 Clutch 30 | Mode 3 Clutch 66 |
|---|---|---|---|
| Mode 1 | X | | |
| Mode 2 | | X | |
| Mode 3 | | | X |

| Mode | Variator Speed Ratio | 36 Var. Output | 22 Mode 1 Gear Out | 64 Mode 3 Gear Out | 50 Sun Gear | 52 Ring Gear | 56 Carrier | 14 FD Input | FD Output |
|---|---|---|---|---|---|---|---|---|---|
| 1st Mode | −1.6923 | −1.6923 | −0.2959 | −0.2959 | −1.6923 | 0.4969 | −0.2959 | 0.4969 | −0.0909 |
| 1st Mode | −0.8171 | −0.8171 | −0.2959 | −0.2959 | −0.8171 | 0 | −0.2959 | 0 | 0 |
| 1st Mode | −0.2959 | −0.2959 | −0.2959 | −0.2959 | −0.2959 | −0.2959 | −0.2959 | −0.2959 | 0.0541 |
| 2nd Mode | −0.2959 | −0.2959 | −0.2959 | −0.2959 | −0.2959 | −0.2959 | −0.2959 | −0.2959 | 0.0541 |
| 2nd Mode | −0.5944 | −0.5944 | −0.2959 | −0.5944 | −0.5944 | −0.5944 | −0.5944 | −0.5944 | 0.1087 |
| 2nd Mode | −1.6923 | −1.6923 | −0.2959 | −1.6923 | −1.6923 | −1.6923 | −1.6923 | −1.6923 | 0.3096 |
| 3rd Mode | −1.6923 | −1.6923 | −0.2959 | −1.6923 | −1.6923 | −1.6923 | −1.6923 | −1.6923 | 0.3096 |
| 3rd Mode | −0.8425 | −0.8425 | −0.2959 | −1.6923 | −0.8425 | −2.1748 | −1.6923 | −2.1748 | 0.3978 |
| 3rd Mode | −0.2959 | −0.2959 | −0.2959 | −1.6923 | −0.2959 | −2.4852 | −1.6923 | −2.4852 | 0.4546 |

Fig. 9

TRANSMISSION PRODUCING STEPLESS VARIABLE SPEED RATIOS

BACKGROUND OF THE INVENTION

1. Field of the Invention

This invention relates generally to the power train of a motor vehicle, and more particularly to a transmission having a variator that produces a stepless, continuously variable range of speed ratios.

2. Description of the Prior Art

An efficient transmission that requires minimum space and is able to produce a continuously variable range of speed ratios is required to optimize fuel economy and performance of motor vehicles equipped with a relatively small engine, particularly in a transverse, front-wheel-drive arrangement of the engine and transmission.

SUMMARY OF THE INVENTION

A transmission includes a variator including a cone secured to an input, and a second cone driveably connected to the cone, producing a variable speed ratio between the cones, a gearset including a member secured to the second cone, and second and third members, a first clutch opening and closing a connection between the input and the second member, and a second clutch opening and closing a connection between an output and the third member.

The transmission is more efficient than a transmission that incorporates other types of variator, as there are fewer gears in the power path, which improves overall mechanical efficiency.

During operation in the third mode, the powerflow is split, such that the variator receives only a portion of the power produced by the engine, thereby reducing variator efficiency losses.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 4 is a chart showing the variation of the speed ratios of system components as the variator speed ratio changes in the transmission of FIG. 1;

FIG. 9 is a chart showing the variation of the speed ratios of system components as the variator speed ratio changes in the transmission of FIG. 5.

DESCRIPTION OF THE PREFERRED EMBODIMENT

Figures 1, 2, 3:
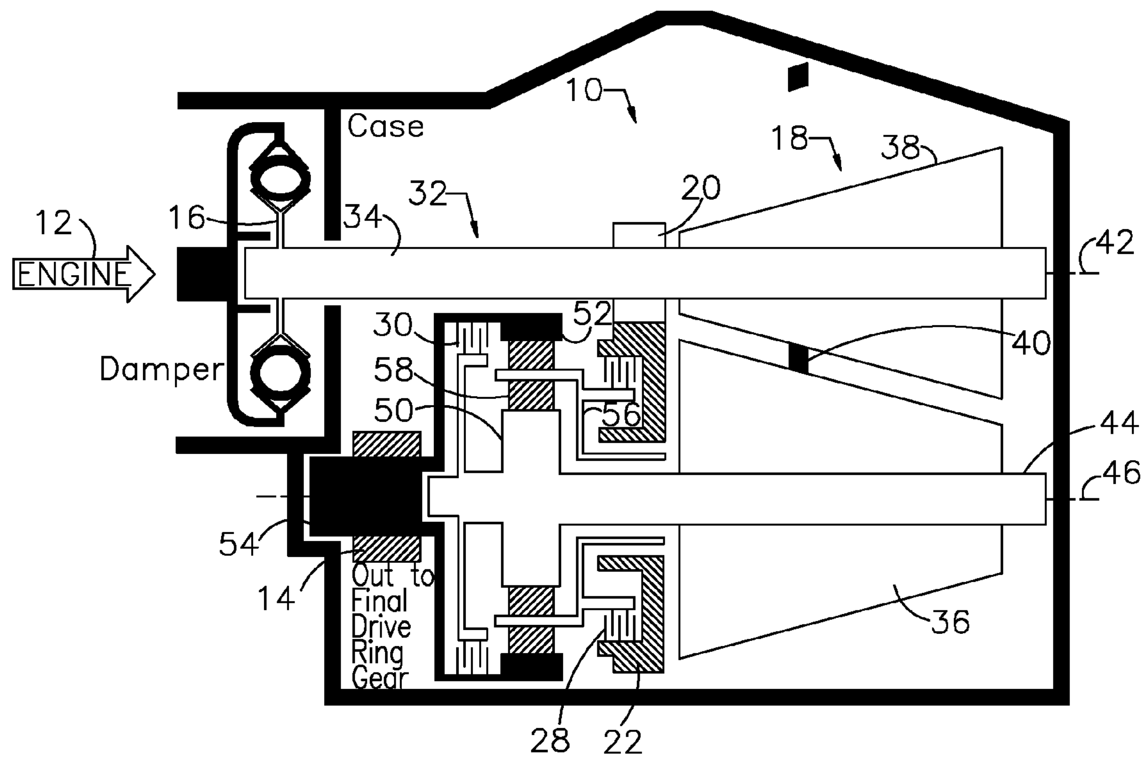
FIG. 1 is a schematic diagram of a dual-mode continuously variable transmission.
FIG. 2 shows a preferred number of gear teeth of the first mode gearset and the final drive of the transmission of FIG. 1.
FIG. 3 shows the beta ratio and a preferred number of gear teeth of the sun gear, ring gear and planet pinions of the mixing planetary gearset of the transmission of FIG. 1.

Referring now to the drawings, FIG. 1 illustrates a dual mode transmission 10 for transmitting power between an engine 12 and a final drive pinion 14. The transmission 10 includes a torsional damper 16; a cone ring variator 18; a first mode gearset comprising pinion 20 and gear 22; a first mode clutch 28; a second mode clutch 30; and a mixing planetary gearset 32. Pinion 20 is secured to input shaft 34 and meshes with gear 22. Variator 18 in combination with mixing planetary gearset 32, gearset 20-22, and clutches 28, 30 produce the multi-mode continuously variable transmission 10.

Cone ring variator 18 produces a continuously variable ratio of the speed of cone 36 to the speed of cone 38 depending on the position of a ring 40, which is controlled to move along the cones changing the speed ratio produced by the variator. The cone 38 is secured to input shaft 34; second cone 36 is secured to layshaft 44, whose axis 46 is substantially parallel to the axis 42 of input shaft 34. Ring 40 transmits rotary power between the cones, and the cones rotate in opposite directions about axes 42 and 46.

Mixing planetary gearset 32 includes a sun gear 50 secured to layshaft 44; a ring gear 52 secured to an output shaft 54; a carrier 56 connected to first mode clutch 28; and planet pinions 58, supported on the carrier and meshing with the ring gear and sun gear.

For the dual mode transmission 10, the cone ring variator is combined with mixing planetary 32, the first mode gearset 20-22, and two control clutches 28, 30. The first mode produces reverse drive and the low forward drive range, in which the output cone 36 of the variator is connected to one member of the mixing planetary gearset 32. A second member of planetary gearset 32 is connected to the output of the first mode gearset 20-22, and the third member of planetary gearset 32 is connected to the output 54 of the transmission 10. The second mode is the high mode, in which the output cone 36 of variator 18 is directly connected to the output 54 and bypasses the mixing planetary gearset 32.

For operation of transmission 10 in the first mode, the first mode clutch 28 is engaged, and the second mode clutch 30 is disengaged. A component on the mixing planetary gearset 32, e. g. carrier 56, is connected to input shaft 34 through gearset 20-22 and first mode clutch 28. A second component on the mixing planetary gearset 32, e. g. sun gear 50, is connected to input shaft 34 through variator 18. A third element of the mixing planetary gearset 32, e.g., ring gear 52, is connected to the output shaft 54 of the transmission 10.

For operation in the second mode, first mode clutch 28 is disengaged, and second mode clutch 30 is engaged. The second mode is the high forward drive mode, in which power is transmitted from engine 12 to output shaft 54 in a power path that includes in successive order input shaft 34, cone 38, ring 40, cone 36, layshaft 44, and second mode clutch 30, thereby bypassing the mixing planetary gearset 32.

With proper selection of the planetary gearset beta ratio, i.e., the ratio of the pitch diameter of ring gear 52 and the pitch diameter of sun gear 50, and the speed ratio of gearset 20-22, operation in the first mode will produce reverse drive, neutral, and low speed forward drive ranges. In addition, a node point is produced, at which the overall speed ratios in first mode and second mode overlap to allow smooth switching between modes.

FIG. 2 the shows preferred number of gear teeth of gearset 20-22 and the final drive.

FIG. 3 shows the beta ratio and a preferred number of gear teeth of the sun gear 50, ring gear 52 and planet pinions 58 of the mixing gearset 32.

As FIG. 4 shows, during a positive torque condition with transmission operating in the first mode, the speed ratio of variator 18 at its maximum −1.6923 and engine speed at reference speed 1.000, the speed of the variator output cone 36 and sun gear 50 is −1.6923, gear 22 and carrier 56 is −0.2959, ring gear 52 and final drive pinion 14 is 0.3383, and the final drive output is −0.0908, reverse drive.

The final drive output speed is zero when the speed ratio of variator 18 decreases to −0.9474 during first mode operation. The final drive output speed is 0.0795 when the speed ratio of variator 18 decreases further to its minimum −0.2959 during first mode operation.

During a positive torque condition with transmission 10 operating in the second mode, with speed ratio of variator 18 at its minimum −0.2959 and engine speed at 1.000, the speed of the variator output cone 36 and sun gear 50 is −0.2959, gear 22 is −0.2959, carrier 56 is −0.2959, ring gear 52 and final drive pinion 14 is −0.2959, and the final drive output is 0.0795, forward drive.

The final drive output speed is 0.1596 when the speed ratio of variator 18 increases to −0.5944 during second mode operation. The final drive output speed is 0.4544 when the speed ratio of variator 18 increases further to −1.6923 during second mode operation.

Figures 5, 6, 7, 8:
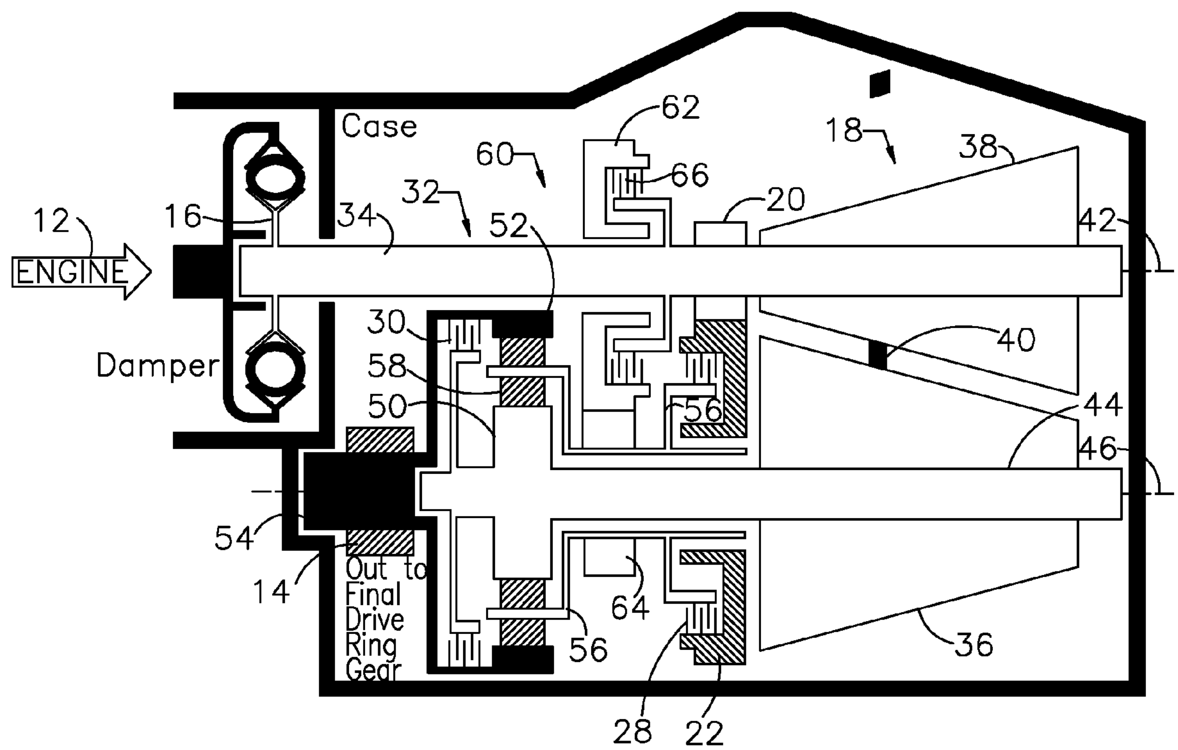
FIG. 5 is a schematic diagram of a triple-mode continuously variable transmission.
FIG. 6 shows a preferred number of gear teeth of the first mode gearset, third mode gearset, and the final drive of the transmission of FIG. 5.
FIG. 7 shows the beta ratio, and a preferred number of gear teeth of the sun gear, ring gear and planet pinions of the mixing gearset of the transmission of FIG. 5.
FIG. 8 shows the states of the clutches during operation in the three modes of the transmission of FIG. 5.

For the triple mode transmission 60, in addition to the components of the dual-mode transmission 10 of FIG. 1, the triple-mode transmission 60 of FIG. 5 includes a third mode transfer gearset, comprising a pinion 62 journalled on shaft 34 and a gear 64 secured to carrier 56; and a third mode clutch 66, which alternately connects and disconnects pinion 62 and input shaft 34. Alternatively, pinion 62 is secured to shaft 34, gear 64 is journalled on carrier 56, and the third mode clutch 66 connects input shaft 34 to the carrier 56 through pinion 62 and gear 64 when clutch 66 is engaged.

In the third mode of triple mode transmission 60, the output cone 36 of the variator 18 is connected to one member of the mixing planetary gearset 32, a second member of planetary gearset 32 is connected to the output gear of the third mode gearset 62-64, and the third member is connected to the output 54 of transmission 60.

During operation in the first mode, clutches 30 and 66 are disengaged and clutch 28 is engaged. Operation in the first mode is substantially identical to that of transmission 10. During operation in the second mode, clutches 28 and 66 are disengaged and clutch 30 is engaged. Operation in the second mode is substantially identical to that of transmission 10. During operation in the third mode, clutches 28 and 30 are disengaged and clutch 66 is engaged.

In the third mode, the output cone 36 of variator 18 is connected to one component of the mixing planetary gearset 32, e.g. sun gear 50; a second component of planetary gearset 32, e.g., carrier 56 is connected to the output of the third mode gearset 62-64 due to the engagement of clutch 66, and a third component of planetary gearset 32, e.g., ring gear 52, is connected to the final drive output pinion 14.

With proper selection of beta, the speed ratios, and the ratio range of variator 18, there is a node point at which the overall ratios of second mode and third mode overlap to allow smooth switching between the second and third modes.

FIG. 6 shows preferred number of gear teeth of the first mode gearset 20-22, third mode gearset 62-64, and the final drive.

FIG. 7 shows the beta ratio, and a preferred number of gear teeth of the sun gear 50, ring gear 52 and planet pinions 58 of the mixing gearset 32.

FIG. 8 shows the states of clutches 28, 30 and 66 during operation in the first, second and third modes.

As FIG. 9 shows, during a positive torque condition with transmission 60 operating in the first mode, the speed ratio of variator 18 is its maximum −1.6923 at reference speed 1.000, the speed of the variator output cone 36 and sun gear 50 is −1.6923, gear 22 and carrier 56 is −0.2959, ring gear 52 and final drive pinion 14 is 0.4969, and the final drive output is −0.0909, reverse drive.

The final drive output speed is zero when the speed ratio of variator 18 decreases to −0.8171 during first mode operation. The final drive output speed is 0.0541 when the speed ratio of variator 18 decreases further to its minimum −0.2959 during first mode operation.

During a positive torque condition with transmission 10 operating in the second mode, with speed ratio of variator 18 at its minimum −0.2959 and engine speed at 1.000, the speed of the variator output cone 36 and sun gear 50 is −0.2959, gear 22 is −0.2959, carrier 56 is −0.2959, ring gear 52 and final drive pinion 14 is −0.2959, and the final drive output is 0.0541, i.e., forward drive.

The final drive output speed is 0.1087 when the speed ratio of variator 18 increases to −0.5944 during second mode operation. The final drive output speed is 0.3096 when the speed ratio of variator 18 increases further to −1.6923 during second mode operation.

During a positive torque condition with transmission 10 operating in the third mode, with speed ratio of variator 18 at −1.6923 and engine speed at 1.000, the speed of the variator output cone 36 and sun gear 50 is −1.6923, gear 64 is −0.2959, carrier 56 is −1.6923, ring gear 52 and final drive pinion 14 is −1.6923, and the final drive output is 0.3096.

The final drive output speed is 0.3978 when the speed ratio of variator 18 decreases to −0.8425 during third mode operation. The final drive output speed is 0.4546 when the speed ratio of variator 18 decreases further to −0.2959 during third mode operation.

In accordance with the provisions of the patent statutes, the preferred embodiment has been described. However, it should be noted that the alternate embodiments can be practiced otherwise than as specifically illustrated and described.

The invention claimed is:

1. A transmission, comprising:

a gearset including first, second and third members;

a variator including a cone secured to an input, a second cone secured to the first member and rotating in an opposite direction from a rotary direction of the cone, axial displacement of a ring along the cones producing a variable speed ratio;

a first clutch releasably connecting the input and the second member;

a second clutch releasably connecting the first and third members.

2. The transmission of claim 1, wherein:

the variator further includes a ring engaging a surface of each cone, the speed ratio produced by the variator changing with movement of the ring along the surfaces of the cones.

3. The transmission of claim 1, further comprising:

a first pinion secured to the input;

a first gear meshing with the first pinion, the first clutch connecting the input and the second member through the first pinion and the first gear.

4. The transmission of claim 3, further comprising:

a second pinion journalled on the input;

a second gear meshing with the second pinion and secured to the second member; and a third clutch opening and closing a connection between the input and the second member through the second pinion and the second gear.

5. The transmission of claim 1, wherein:

the first member is a sun gear;

the second member is a carrier;

the third member is a ring gear; and the gearset further comprises planet pinions supported on the carrier and meshing with the sun gear and the ring gear.

6. A transmission, comprising:

a gearset including first, second and third members;

a variator including a cone secured to an input, a second cone secured to the first member and rotating in an opposite direction from a rotary direction of the cone, axial displacement of a ring along the cones producing a variable speed ratio;

a first clutch releasably connecting the input and second member;

a second clutch releasably connecting the first member, an output and third member;

a third clutch releasably connecting the input and second member.

7. The transmission of claim 6, wherein:

the first member is a sun gear;

the second member is a carrier;

the third member is a ring gear; and the gearset further comprises planet pinions supported on the carrier and meshing with the sun gear and the ring gear.

8. The transmission of claim 6, further comprising:

a first pinion secured to the input;

a first gear meshing with the first pinion, the first clutch connecting the input and the second member through the first pinion and the first gear.

9. The transmission of claim 8, further comprising:

a second pinion journalled on the input;

a second gear meshing with the second pinion, the third clutch connecting the input and the second member through the second pinion and the second gear.

10. The transmission of claim 6, wherein:

the variator further includes a ring engaging a surface of each cone, the speed ratio produced by the variator changing with movement of the ring along the surfaces of the cones.

11. A transmission, comprising:

a gearset including first, second and third members;

a variator including a cone secured to an input, and a second cone rotating in an opposite direction from a rotary direction of the cone, driveably connected by a ring to the cone and secured to the first member, axial displacement of the ring along the cones producing a variable speed ratio between the cones;

a first gearset comprising a pinion secured to the input, and a first gear meshing with the first pinion;

a first clutch releasably connecting the input and the second member through the first pinion and the first gear;

a second gearset comprising a second pinion concentric with the input, and a second gear meshing with the second pinion and concentric with the second member;

a second clutch releasably connecting the first member, an output and the third member;

a third clutch releasably connecting the input and the second member through the second gear and the second pinion.

12. The transmission of claim 11, wherein:

the first member is a sun gear;

the second member is a carrier;

the third member is a ring gear; and the gearset further comprises planet pinions supported on the carrier and meshing with the sun gear and the ring gear.

13. The transmission of claim 11, wherein:

the variator further includes a ring engaging a surface of each cone, the speed ratio produced by the variator changing with movement of the ring along the surfaces of the cones.

14. A method for operation of a transmission, comprising:

securing a variator to an input, a sun gear of a gearset and a second clutch;

axially displacing a ring along the variator to vary a speed and rotary direction of the sun gear relative to the input;

using a first clutch to releasably connect an input and a carrier of the gearset; and using the second clutch to releasably connect the sun gear and an output of the transmission.

15. The method of claim 14, further comprising:

producing a low forward range by increasing the speed ratio of the variator.

16. The method of claim 14, further comprising:

producing a high low forward drive range by using the first clutch to connect to the carrier of the gearset and using a second clutch to disconnect the output of the gearset from the output of the variator.

17. The method of claim 16, further comprising:

producing a lower forward drive range by increasing a negative speed ratio of the variator.

18. The method of claim 17, further comprising:

producing a reverse drive by further increasing the negative speed ratio of the variator.

* * * * *